United States Patent [19]

Sanders

[11] Patent Number: 4,908,758

[45] Date of Patent: Mar. 13, 1990

[54] METHOD OF OPERATING A COMPUTER FOR RANK ORDERING AND WEIGHTING CATEGORY ALTERNATIVES

[76] Inventor: Michael J. Sanders, 14732 W. 90th Ter., Lenexa, Kans. 66215

[21] Appl. No.: 133,959

[22] Filed: Dec. 17, 1987

[51] Int. Cl.[4] .............................. G06F 7/00; G06F 7/24
[52] U.S. Cl. .................................... 364/300; 364/200; 364/283.1; 364/222.81
[58] Field of Search ... 364/200 MS File, 900 MS File, 364/300

[56] References Cited

U.S. PATENT DOCUMENTS

| | | | |
|---|---|---|---|
| 3,610,902 | 10/1971 | Rahenkamp et al. | 364/200 |
| 4,186,438 | 1/1980 | Benson et al. | 364/200 |
| 4,210,961 | 7/1980 | Whitlow et al. | 364/300 |
| 4,358,824 | 11/1982 | Glickman et al. | 364/200 |
| 4,414,629 | 11/1983 | Waite | 364/300 |
| 4,611,280 | 9/1986 | Linderman | 364/200 |

OTHER PUBLICATIONS

Kerlinger, Fred N.; Foundations of Behavioral Research, 2nd Ed.; 1964; pp. 492-513; Lib. of Cong., #72-91751.

Primary Examiner—Eddie P. Chan
Assistant Examiner—Joseph T. Fitzgerald
Attorney, Agent, or Firm—Hovey, Williams, Timmons & Collins

[57] ABSTRACT

A user interactive method of operating a computer is provided for producing a user-weighted ordinal rank order preference scale of rank ordered expression alternatives associated with a plurality of expressions. In the preferred method, the user interacts with the computer system to initially rank all of the alternatives and then assigns point values to the alternatives whereupon the computer calculates a point value weight for each factor level.

10 Claims, 3 Drawing Sheets

METHOD OF OPERATING A COMPUTER FOR RANK ORDERING AND WEIGHTING CATEGORY ALTERNATIVES

BACKGROUND OF THE INVENTION

1. Field of the Invention

The present invention relates to a user interactive method of operating a computer system for producing a weighted ordinal rank order preference scale of selected alternatives. More particularly, the invention hereof relates to a method wherein a computer system prompts the user to rank alternatives making up a variety of categories and to provide point values whereby the computer system then calculates a weighted point value consistent with the rank and point value of the alternatives.

2. Description of the Prior Art

In the behavioral and social sciences, researchers and investigators endeavor to quantify subjective variables by developing measurements of such things as personality traits, attitudes, intelligence, preferences, interests, and so forth. Various techniques have been developed for quantifying and measuring these variables such as the socalled rank order and forced choice systems.

In the rank order system, various subjective variables in the form of categories are presented to subjects who are asked to rank possible alternatives according to preference, interest, or some other criteria. The rank order system is limited in its utility, however, because if too many possible alternatives are presented to the subject at a time, the subject may become confused. Because of this, the subject may rank the alternatives differently if asked to do so again. In order to achieve reliable results, the researcher or investigator must limit the number of possible alternatives in a set to be ranked to preferably no more than five at a time, which in turn limits the utility of prior art rank order systems.

In the forced choice system, a subject is presented with pairs of alternatives and must choose one of the pair according to specified criteria. The number of possible choices, however, increases geometrically with the number of possible alternatives. For example, if five alternatives are included in each of two categories, the forced choice system requires that each alternative of one category be paired with every other alternative in the other category. This results in 25 possible forced choices. Thus, the forced choice system becomes unwieldly if very many alternatives are involved.

The task of quantifying subjective variables becomes even more complex if it is desired to weight the alternatives in addition to rank ordering them. For example, in the forced choice system, rather than choosing between agree and disagree as possible alternatives, the subject may be asked to respond with strongly agree, mildly agree, mildly disagree, or strongly disagree. This further complicates the quantifying task and adds to the length of time required for the subject to complete the process. Even more complexity is added if the alternatives have an intrinsic order or the final hierarchical level of any one of the alternatives is dependent on any other alternative. The process employed must therefore assure that this dependency is reflected in the final rank order.

Despite the complexity of conventional systems in measuring subjective variables, such measurements are nonetheless important, for example, to corporations in achieving goals, to society in understanding attitudes, preferences, moral values, and so forth, and to individuals in determining career choices based on interests and abilities.

As a further example, a management consultant may help quantify the value of various job positions so that an organization can pay an appropriate salary to retain or attract employees. The first step in quantifying the value or worth of a job position to a particular organization is to develop the variable categories in terms of job factors pertaining to each job position. Applicable job factors might include such things as education, length of service, decision making, complexity of the job, independent judgement, interpersonal skills, accountability, and so forth.

After the job factors have been identified, possible alternatives or factor levels for each job factor are then defined. Intrinsic orders are then identified. For example, the job factor of education may include factor levels as levels of education such as Ph.D., Masters, and Bachelors degrees, vocational training, and high school. After defining the factor levels, the intrinsic orders are identified and the factor levels (alternatives) are arranged in descending order of importance such as the order of the education levels described above.

In the prior art, each factor level is typically assigned a point value as a weight somewhat arbitrarily by the consultant based on varying degrees of input from general business or industry studies. A factor level from each factor is then identified for each job position based on a prepared job description. The weighted point values of the level pertaining to each job position are then added to determine a total point value for each position as reflecting the value of each position to the organization.

The technique of developing point values for job positions as described above typically does not adequately reflect the perceived goals of the organization. That is to say, the process of arbitrarily assigning weighted point values to the job factor levels by the management consultant and others only coincidentally reflect the goals of the organization. For example, a high level of technical education may be vital to a company who plans to invent or develop new products. In contrast, a similar company may adopt the strategy to improve its business position by stressing its customer service. In this latter case, achievement of corporate goals may depend much less on whether the corporation's employees have a graduate degree in any technical subject than on the interpersonal skills of its employees.

An evaluation system which does not reflect the goals and requirements of the organization may produce an evaluation scheme which is inaccurate or even misleading. Such a scheme may lead a company which is focused on new products to undervalue the worth of its technically educated employees, and may lead a service organization to undervalue the worth of those job positions with a high degree of contact with the public.

Such deficiencies point out the need to reflect additional variables during the process of rank ordering and weighting alternatives. The inclusion of additional subjective variables, however, adds even more complexity to prior art measurement systems which are already too complex and variable in their reliability.

SUMMARY OF THE INVENTION

The problems as outlined above are solved by the system and user interactive method of operating a computer in accordance with the present invention. That is to say, the system and method hereof allow a user to interact with a computer in order to produce weighted rankings of alternative responses making up various categories pertaining to the areas of behavorial or social sciences including management consulting.

The preferred computer system for implementing the present invention includes a microcomputer such as a personal computer having a memory associated therewith for storing data and an auxilliary memory in the form of a floppy disk drive, a hard disk memory system, an input device such as a keyboard, and output devices preferably including a CRT display and a printer.

The method of the present invention is preferably implemented in the form of a computer program for operating a computer, and is preferably embodied in the medium of a floppy disk for data and a hard disk system for the programs.

In the preferred method, the highest hierarchically ordered alternatives from each category are displayed whereupon the user selects one of the displayed alternatives as the highest ranked. The selection is then entered and stored as a rank. The selected alternative is then replaced with the next hierarchically ordered alternative from the same category. The selection steps are repeated until this pass is completed and all of the alternatives have been ranked. In cases where there are more than five, but fewer than 25 categories, two passes are required. Additional passes are required when there are more than 25 categories.

After all the altervatives have been ranked, the two highest ranked alternatives are then displayed whereupon the user distributes 100 points between the two displayed alternatives according to use-perceived relative importance and enters this data. The highest ranked alternative on the display is then replaced with the next highest ranked, previously non-displayed alternative whereupon 100 points are again distributed between the two displayed alternatives. These steps are repeated until all alterntives have been displayed.

Finally, the user assigns and enters a base point value to the lowest ranked response by assigning between 50 and 100 points to that response. The computer then calculates a normalized and scaled point value weight for each response which represent the weighted ordinal rank order preference scale of the responses.

BRIEF DESCRIPTION OF THE DRAWING FIGURES

FIGS. 1A, 1B, and 1C represent a computer program flowchart illustrating the preferred method for implementing the present invention; and FIG. 2 is a schematic illustration of the preferred computer system of the present invention.

DETAILED DESCRIPTION OF THE PREFERRED EMBODIMENT

Figure 2:
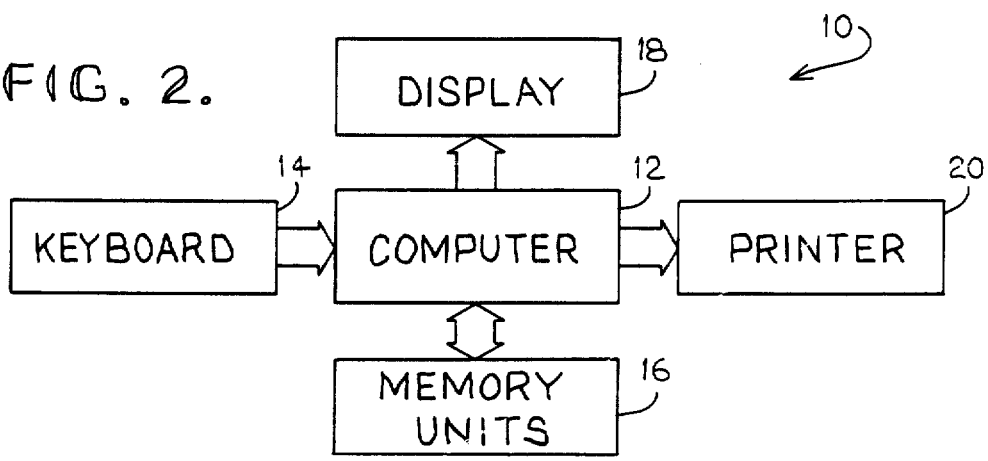

FIG. 2 illustrates the preferred computer system 10 of the present invention. Computer system 10 preferably includes a conventional microcomputer 12 such as a personal computer, an input device preferably in the form of conventional keyboard 14, an auxiliary memory unit preferably in the form of a conventional floppy disk drive and hard disk system 16, an output device in the form of a conventional CRT display 18, and a second output device preferably in the form of a conventional printer 20.

Those skilled in the art will appreciate that the method of the present invention is applicable to operating virtually all types of computers and the preferred computer system as described herein is merely illustrative of the preferred environment.

The method of the present invention for operating a computer system is preferably embodied in the form of a computer program fixed in the medium of a conventional hard disk system which, by means of hard disk drive 16, can be used to transfer parts of the computer program from the hard disk to the internal memory (not shown) of microcomputer 12 as needed. Data is transferred to the hard disk system before each session and in turn is copied to internal memory as needed.

For the sake of clarity, the method of the present invention is described herein in the context of a management consulting environment in which an organization wishes to quantify various job positions to determine their worth or value in light of the organization's goals and requirements. Initially, the organization identifies the various job factors (less than 25 for this example) which pertain to the various job positions. For example, typical job factors may include education, complexity of the job, independent judgement, interpersonal skills, accountability, decision making, planning, technical skill and knowledge, and so forth.

After the job factors have been identifed, a set of factor levels corresponding to each factor are also identifed in intrinsic order. For the job factor of education, the ordered levels might include Ph.D, Masters, and Bachelors degrees, two year technical degree, high school education, basic literacy, and minimal literacy and verbal skills for a total of seven ordered factor levels making up the set of alternatives corresponding to the job factor category of education.

The terms job factor and factor level used herein are special cases of, and correspond respectively to, the more general terms of category and alternative. Accordingly, the concepts of the present invention described in the context of job position analysis herein are equally applicable to other fields such as the behavioral and social sciences, among others.

Next, the organization identifies the factor levels from each job factor applicable to each job position. That is to say, one level from each job factor is identified for each job position according to the job description for that position.

The preferred method for operating a computer enables an organization to develop a weighted point value associated with each factor level and, by adding all of the weighted point values of the levels associated with a given job position, to develop a total point value associated with each job position. The job position point totals can then be compared to one another for compensation and other purposes.

Figure 1A:
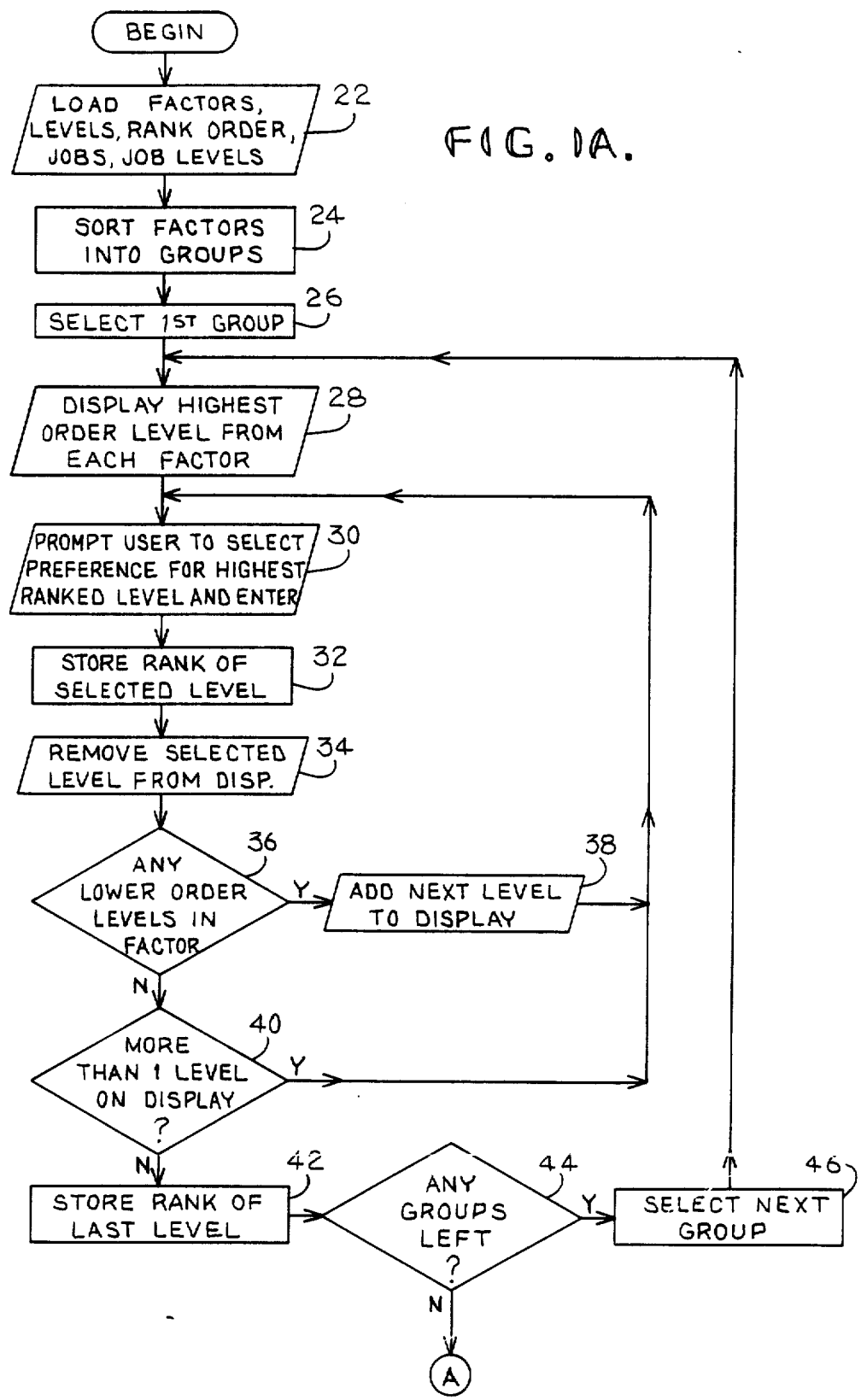

Referring to the flowchart of FIG. 1A, the preferred computer program for implementing the method of the present invention for operating computer system 10 enters at step 22 in which the user selects or enters the job factors, job levels, intrinsic order of the levels, the various job positions, and the particular factor levels pertaining to each job position. This data may also be resident on a floppy disk in which the data is loaded into the computer system 10 in step 22. Preferably, the program is written using the KNOWLEDGEMAN II programming system.

In step 24, the program sorts the job factors into groups of five factors. This is done so that no more than five levels are presented to the user at any one time in order to avoid the confusion and inconsistency of results which may occur if too many levels are presented at once. In other words, to obtain consistent and thereby reliable results, it is preferred that no more than five factor levels be presented at a time.

The program then moves to step 26 and selects the first group of five factors. In step 28, the program displays the highest ordered level from each factor of the first group. Thus, the user is initially presented with five levels on CRT 18—one from each of the factors in the first group.

In step 30 the program prompts the user to select one of the five displayed levels as the highest ranked level of the five. The user then enters the selection by means of keyboard 14.

The program then moves to step 32 in which the rank of the level selected in step 30 is stored in memory. For example, the initial level selected is assigned the rank of one, the second selection is assigned the rank of two, and so on for the group being processed.

In step 34, the program removes the selected level from the display and then moves to step 36 which asks whether any other levels remain to be selected from the same factor level set associated with the level selected in step 30. If yes, the program adds the next ordered level to the display in place of the selected level.

The program then loops back to step 30 to repeat steps 30-38 until all of the levels in one of the factors have been selected. When this occurs, the answer in step 36 is no and the program moves to step 40 which asks whether more than one level is still present on the display. If such is the case, this indicates that all of the levels of all of the factors of the first group have not yet been ranked, and the program loops back to step 30 to repeat steps 30-40 until only one level remains on display.

When only one level remains on the display, this indicates that only one factor remains and the answer in step 40 is no and the program moves to step 42 to store the last remaining level as the last or lowest ranked level of the group. If more than one level remains for this last factor, the levels are stored in descending intrinsic rank order. At this point in the program, all of the levels within the group have been ranked.

The program then moves to step 44 which asks whether any factor groups remain to be processed. If one or more groups remain, the answer in step 44 is yes, and the program moves to step 46 to select the next group. The program then loops back to step 28 and repeats steps 28-46 until all of the factor levels within each group have been ranked. When no more groups are left to be processed, the answer in step 44 is no.

Figure 1B:
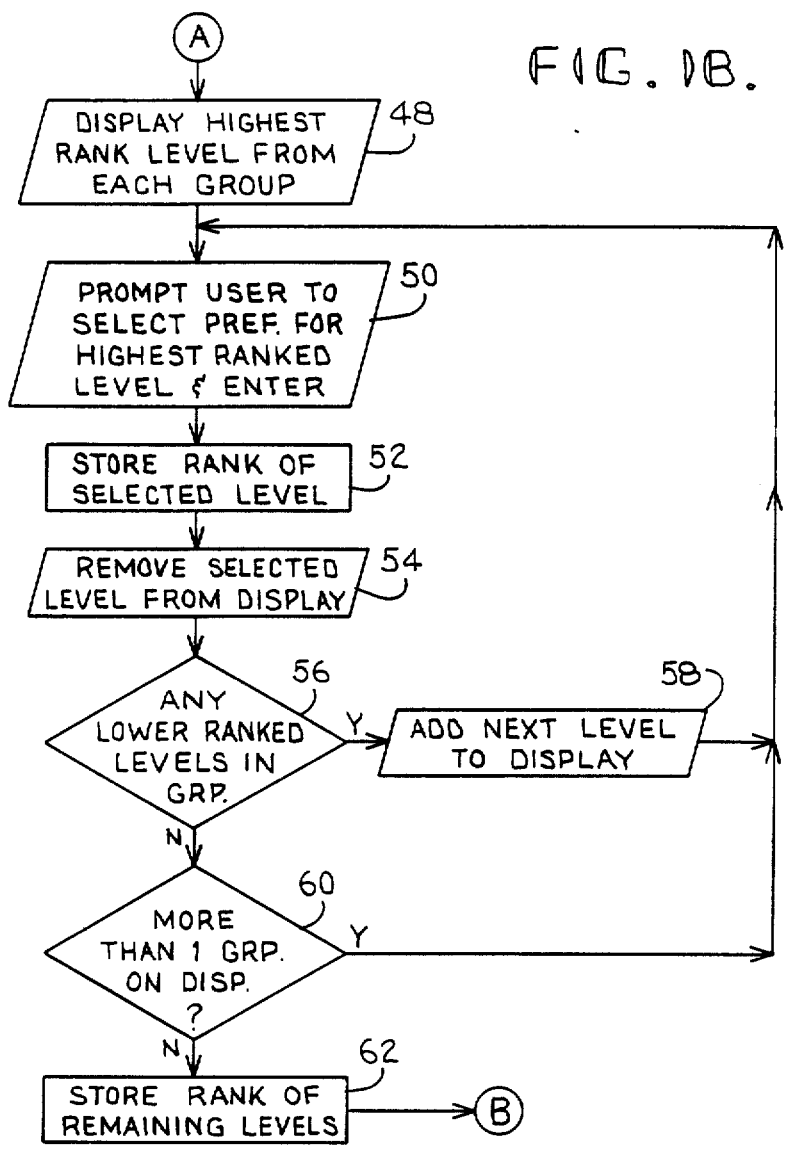

FIG. 1B illustrates the next portion of the program flowchart. This portion operates computer system 10 with user interaction in order to achieve an overall rank of all of the factor levels making up the groups by using the ranking process similar to that illustrated in FIG. 1A and discussed above.

When the answer in step 44 is no, the program moves to step 48 of FIG. 1B in which computer system 10 displays the highest ranked level from each group to the user. The program then prompts the user in step 50 to enter the user's preference for the highest ranking factor level from among those presented on the display. After the user enters the selection, the program moves to step 52 to store a new rank of the level selected in step 50. During the first iteration through this portion of the program, the factor level selected in step 50 is assigned the highest rank, that is, rank number one, as the highest ranking factor level. The program then moves to step 54 which removes the selected level from the display, and then asks in step 56 whether any lower ranking levels remain in the group of the level selected in step 50.

If the answer in step 56 is yes, the program adds the next lowest ranked factor level from the same group to the display. The program then loops back and repeats steps 50-58 until all of the factor levels in one of the groups have been assigned a rank. When this occurs, the answer in step 56 is no, and the program moves to step 60 which asks whether levels from more than one group remain on the display. The answer in step 60 is normally yes until all the factor levels have been ranked and accordingly the program loops back to step 50 and repeats steps 50-60 until only one factor level remains on display.

This occurs when all the factor levels have been ranked except for the remaining levels within one particular group. Since the factor levels in each group have already been ranked in that portion of the program illustrated in FIG. 1A, the answer in step 60 is no, and the program moves to step 62. In step 62, the program assigns and stores the appropriate rank of the remaining levels of the last group in the order of their rank as previously determined.

After completion of step 62, all of the levels from all of the factors have been assigned an overall rank according to the preference of the user. The user selections desirably reflect the preference of the entire organization and not just the preference of any one individual. Those skilled in the art will appreciate, however, that the method hereof for operating system 10 can easily embody a technique whereby a number of users each indicate their individual preferences. The program so modified according to conventional techniques can then develop rankings for the factor levels as an average of the preferences of all the users.

After all of the factor levels have been ranked, the task remains to assign a weight to each factor level to more realistically quantify the relative importance of each factor level. That is to say, the ranking of the factor levels reflects only whether one factor level is more important than another, but does not reflect how much more important, or how much more preferred that factor level is.

Figure 1C:
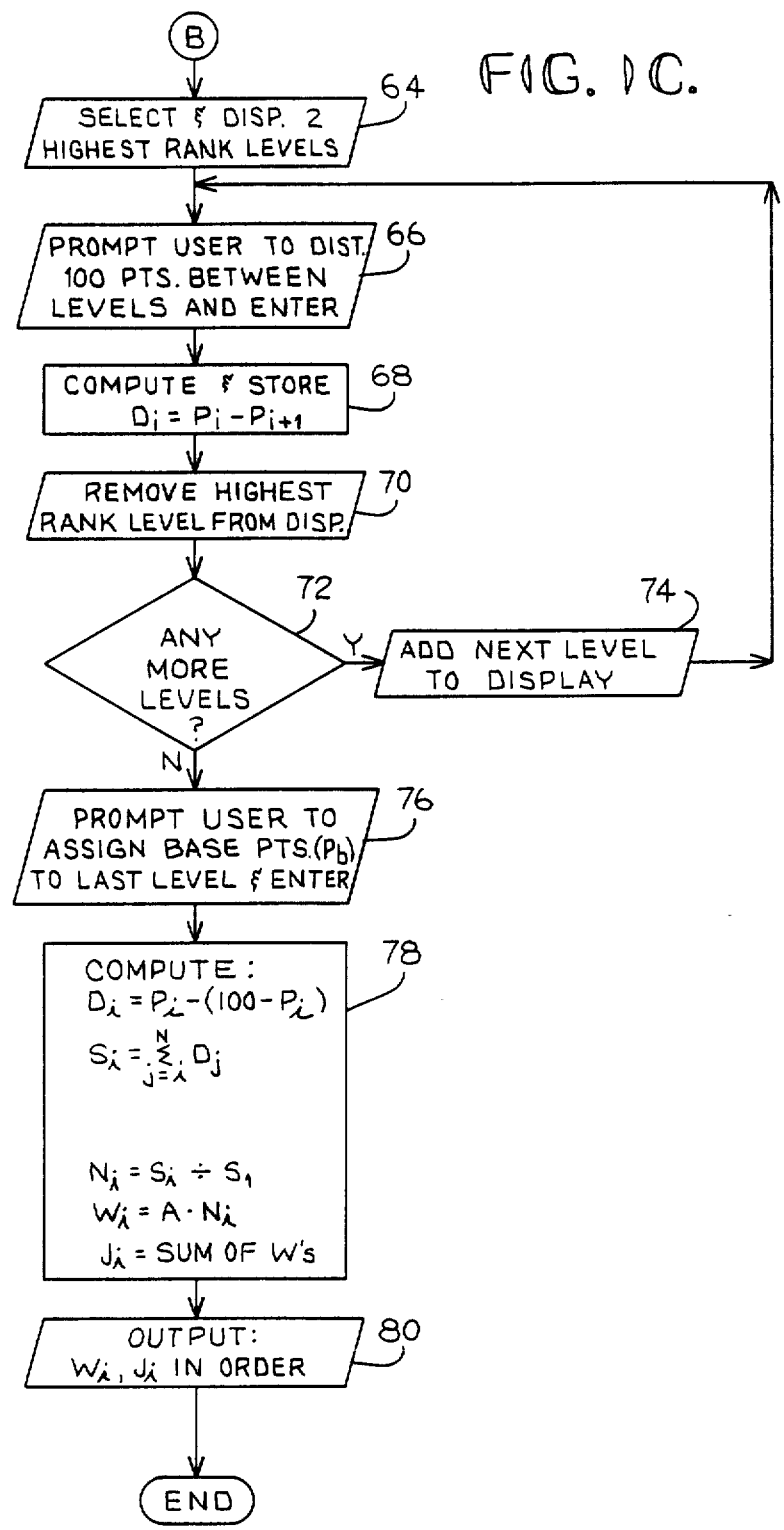

The remaining section of the computer program flowchart in FIG. 1C illustrates the preferred method for weighting each factor level consistant with its rank. Those skilled in the art will appreciate that the teachings of the present invention encompasses many variations in the preferred embodiments described herein. For example, for systems of one group only (five categories for this example), the system would not require pass 2 described in FIG. 1B. In addition, for systems with more groups than can be handled by two passes (five groups for this example), additional passes will achieve the same results.

After step 62 of FIG. 1B, the program moves to step 64 as shown in FIG. 1C. In step 64, the program selects the two highest ranking factor levels for display to the user. The program then moves to step 66 which prompts the user to distribute 100 points between the two displayed factor levels. For example, if the user perceives that the higher ranking factor level is only slightly more important or slightly more preferred than the lower ranking of the two, the user might assign 55 points to the higher ranking factor level displayed, whereupon the program assigns 45 points (100−55) to the lower ranking factor level. Those skilled in the art will appreciate that the program can incorporate means for displaying an "error" signal to the user if the user assigns a greater number of points to the lower ranking factor level which would be inconsistent with the ranking scheme.

After step 66, the program moves to step 68 to compute and store the point value difference $D_i$ between the points $P_i$ assigned to the higher ranking factor level less the points $P_{i+1}$ assigned to the next lower ranking factor level. For example, the point value assigned to the highest ranking factor level, that is, to factor level 1, is $D_1$ which equals the difference between $P_1$ and the point value $P_2$ assigned to the second ranking factor level. In the example above, $D_1$ equals 10 which is the difference between 55 ($P_1$) and 45 ($P_2$) points or more simply $P_1$ less the difference between 100 and $P_1$.

The program then moves to step 70 which removes the higher ranking factor level from the display, and then moves to step 72 which asks whether any more levels remain to be assigned point values. The answer in step 72 is yes until all of the levels have been assigned a point value, and the program moves to step 74 which adds to the display the next highest, previously undisplayed level.

The program then loops back to step 66 which, in the example, now presents levels 2 and 3 to the user to again distribute 100 points between them. The program continues to loop through steps 66–74 until all of the factor levels have been paired with the next lower ranked level, and until a point value weight $P_i$ has been assigned and a point difference $D_i$ has been calculated for each. Using these differences, each level receives a comparison value based on the user's perception of its importance relative to the next lower ranking level.

After all of the factor levels have received a point value $P_i$ and only the lowest ranking factor level remains on the display, the answer in step 72 is no, and the program moves to step 74 which prompts the user to assign a base point value $P_b$ to the lowest ranked factor level. For example, the user is prompted to assign a minimum of 50 points to the lowest ranked level if this level is perceived as being only slightly important, and greater points if perceived as more important, up to a maximum of 100 points. The program then moves to step 78 to compute the variable $D_N$ according to the formula as shown in order to calculate a comparison value for the lowest ranking factor level (n).

Next, the program operates system 10 in order to compute the variable $S_i$ according to the formula shown in step 78 for each factor level. The variable $S_i$ will be used to calculate a normalized point value weight ($N_i$) described hereinbelow. For example, $S_i$ for the third ranked factor level, $S_3$, equals the sum of $D_3$ through $D_n$.

The variable $N_i$ is then calculated for each factor level as the ratio between $S_i$ and $S_1$ according to the formula shown to produce a normalized value for each factor level. For example, $N_1$ will equal 1.00 because $S_i$ equals $S_1$ for the first factor level. All other factor levels will have a normalized value less than 1.00.

A scaled value $W_i$ for each level is then computed by multiplying the normalized value $N_i$ for each factor level by a constant A. The system user can choose the constant A to develop a convenient point value from which to work. For example, the constant A might equal 100 in which case the highest rank factor level will have a weighted value $W_1$ of 100 scaled points and all other lower ranked levels will have a lesser but positive scaled value.

The last process is to select appropriate levels from each factor and to add all the scaled point values associated with each job position in order to develop a job point total $J_i$. That is to say, for a given job position $J_i$, the scaled point values $W_i$ for each level associated with that job position are added to develop the job point total $J_i$. When this process is complete for each job position, job point total $J_i$ for each job position presents to the organization a quantified basis on which to compare one job position to another.

After step 78 in which all of the computations are completed, the program moves to step 80 in which the computer program operates system 10 in order to produce a print-out on printer 20 listing the scaled point values $W_i$ for each factor level in descending order, and the job position point total $J_i$ for each job position. The program then ends.

Those skilled in the art will appreciate that the teachings of the present invention encompass many variations in the preferred embodiments described herein. For example, in weighting the factor levels, more than two could be presented at a time and the user could be prompted to distribute points to the displayed levels as desired to reflect relative importance. Additionally, a set of alternatives already rank ordered could be presented for weighting. Also, any number of levels could be displayed for ranking rather than limiting the selection to five levels as preferred herein. Finally, the present invention can also be used to initially hierarchically order the responses associated with a given category. Other variations will be apparent to those skilled in the art.

Having thus described the preferred embodiments of the present invention, the following is claimed as new and desired to be secured by Letters Patent:

1. A user-interactive method of operating a computer for producing an overall ranking of data items such as job factor levels, alternatives, and the like making up a data set, the computer including a memory for storing data including said data set, an input device for entering data, and an output device for displaying data, said method comprising the steps of:

(a) storing said data set in said memory whereby said data items included in said data set are arranged into a plurality of categories with the data items included in each category having a category rank relative to one another and presenting a pair of terminal items respectively representing the highest and lowest ranked items in the category;

(b) retrieving from the memory and displaying on the output device a data display including a terminal data item of corresponding category rank from selected ones of the categories;

(c) entering into the computer data representative of the user's selection of the one of the items included in said display;

(d) assigning in the computer a sequential rank to said user's selection and storing said sequential rank in the memory;

(e) retrieving from the memory a previously non-displayed replacement data item from the same category as said selection and nearest in category rank to said selection, and replacing said selection on said display with said replacement data item; and (f) repeating steps (c) and (e) until a sequential rank has been assigned and stored for each item from said selected ones of the categories thereby producing an overall ranking of the data items thereof.

2. The method as set forth in claim 1, the data items included in said overall ranking making up an overall ranked item set presenting a pair of terminal, ranked, data items respectively representing the highest and lowest ranked item in said item set, said method further including the steps of:

(g) retrieving from the memory and displaying on the output device an item display including one of said terminal, ranked, data items, and at least one other item from said item set nearest in overall rank to said one of said terminal, ranked, data items;

(h) entering into the computer data representative of user-assigned points for each of the items included in said item display;

(i) assigning in the computer a point value weight corresponding to said user-assigned points to the highest ranking item on said item display and storing said point value weight in the memory;

(j) retrieving from the memory a substitute data item from said item set nearest in rank to the items previously included in said item display and replacing said highest ranking item on said item display with said substitute item; and (k) repeating steps (h) through (j) until a point value weight has been assigned and stored for each item in said item set thereby producing a ranked and weighted data item set.

3. The method as set forth in claim 2, said one of the terminal, ranked, data items being the highest ranked item from the item set.

4. The method as set forth in claim 2, the sum of said user-assigned points for each of the items included in said item display being equal to a predetermined number of points.

5. The method as set forth in claim 4, said predetermined number of points being equal to one hundred points.

6. The method as set forth in claim 2, further including the step of normalizing each of said point value weights in order to produce a normalized weight for each of said item and storing said normalized weight.

7. The method as set forth in claim 6, further including the step of scaling said normalized weights by multiplying each by a predetermined constant in order to produce a corresponding scaled weight, and storing said scale weight in the memory.

8. The method as set forth in claim 1, said terminal item from selected ones of the categories being the highest ranked terminal item thereof.

9. The method as set forth in claim 1, further including the steps of:

after step (a), in the computer, organizing the categories into category groups and limiting the number of categories included in each group to a predetermined maximum number, said selected ones of the categories being a selected one of said category groups;

repeating steps (b) through (f) for each of said groups thereby producing an overall group ranking for each of the items in each of said groups; and treating each group as a category and repeating steps (b) through (f) to produce an overall ranking of all of the items included in the item set.

10. A user-interactive method of operating a computer for weighting a plurality of data items included in an overall ranked data item set, the computer including a memory for storing data including said items and said sets, an input device for entering data, and an output device for displaying data, said method comprising the steps of:

(a) storing said data set in said memory whereby said data items included in said data set are arranged into a plurality of categories with the data items included in each category having a category rank relative to one another and presenting a pair of terminal items respectively representing the highest and lowest ranked items in the category;

(b) retrieving from the memory and displaying on the output device an item display including one of said terminal, ranked, data items and at least one other item from said item set nearest in overall rank to said one of said terminal, ranked, data items;

(c) entering into the computer data representative of user-assigned points for each of the items included in said item display;

(d) assigning in the computer a point value weight corresponding to said user-assigned points to the highest ranking item on said item display and storing said point value weight in the memory;

(e) retrieving from the memory a substitute data item from said item set nearest in rank to the items previously included in said item display and replacing said highest ranking item on said item display with said substitute item; and (f) repeating steps (c) through (e) until a point value weight has been assigned and stored for each item in said item set thereby producing a ranked and weighted data item set.

* * * * *